United States Patent
Umezawa (10) Patent No.: US 7,407,595 B2
(45) Date of Patent: Aug. 5, 2008

(54) OPTICAL MEMBER, MANUFACTURING METHOD OF THE OPTICAL MEMBER, WAVEGUIDE SUBSTRATE, AND PHOTO-ELECTRIC INTEGRATED SUBSTRATE

(75) Inventor: Tomoki Umezawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 96 days.

(21) Appl. No.: 11/184,804

(22) Filed: Jul. 20, 2005

(65) Prior Publication Data

US 2006/0215982 A1 Sep. 28, 2006

(30) Foreign Application Priority Data

Mar. 23, 2005 (JP) ............... 2005-083309

(51) Int. Cl.
*B29D 11/00* (2006.01)
(52) U.S. Cl. .............. 216/24; 216/17; 216/18; 216/26
(58) Field of Classification Search .......... 216/17, 216/18, 24, 26; 385/14
See application file for complete search history.

(56) References Cited

U.S. PATENT DOCUMENTS

| | | | |
|---|---|---|---|
| 5,500,869 A * | 3/1996 | Yoshida et al. ......... | 372/50.23 |
| 5,559,918 A * | 9/1996 | Furuyama et al. ......... | 385/92 |
| 5,644,667 A * | 7/1997 | Tabuchi ................. | 385/49 |
| 6,801,679 B2 * | 10/2004 | Koh et al. .............. | 385/14 |
| 2002/0008916 A1 * | 1/2002 | Nishikawa et al. ...... | 359/619 |
| 2002/0015239 A1 * | 2/2002 | Yamashita et al. ...... | 359/819 |
| 2004/0190814 A1 * | 9/2004 | Suzuki ................. | 385/14 |

FOREIGN PATENT DOCUMENTS

| | | | |
|---|---|---|---|
| JP | 2000-28838 A | * | 1/2000 |
| JP | A-2003-131081 | | 5/2003 |
| JP | A-2003-172837 | | 6/2003 |
| JP | A-2003-195123 | | 7/2003 |
| JP | A-2004-191903 | | 7/2004 |

* cited by examiner

*Primary Examiner*—Shamim Ahmed
(74) *Attorney, Agent, or Firm*—Morgan, Lewis & Bockius LLP (57) ABSTRACT

A manufacturing method of an optical member for optical path conversion to be connected to an optical waveguide provided in a substrate includes forming plural inclined surfaces on a wafer by etching, forming openings corresponding to the inclined surfaces in a plate-like member, forming a combined body, in which the inclined surfaces and the openings correspond to each other, by bonding the wafer and the plate-like member, and dividing the combined body into small pieces each of which includes the inclined surface and the opening.

9 Claims, 8 Drawing Sheets

FIG. 1

FIG. 2A
THROUGH-HOLE SUBSTRATE

FIG. 2B
V-GROOVE SUBSTRATE

OPTICAL MEMBER, MANUFACTURING METHOD OF THE OPTICAL MEMBER, WAVEGUIDE SUBSTRATE, AND PHOTO-ELECTRIC INTEGRATED SUBSTRATE

BACKGROUND OF THE INVENTION (1) Field of the Invention

The present invention relates to an optical member to be connected to an optical waveguide provided in a substrate, a manufacturing method of the optical member, a waveguide substrate, and a photo-electric integrated substrate, and particularly to an optical member for optical path conversion, which converts an optical path of transmitted light, a manufacturing method of the optical member, a waveguide substrate, and a photo-electric integrated substrate.

(2) Description of the Related Art

Various mounting techniques for mounting an optical multi-chip module (MCM) on an electric wiring substrate having an optical waveguide are conventionally proposed. In the technique, various parts are mounted on a substrate at high density to realize a small photo-electric integrated substrate. In order to realize this, it is necessary to provide a 90° optical path conversion technique to optically connect an optical element, such as a vertical cavity surface emitting laser (VCSEL) or a photodiode (PD), mounted on a substrate and an optical waveguide provided in the substrate.

However, conventionally, an optical path conversion technique (optical member) in which high density mounting is possible, the mounting accuracy of an optical MCM can be moderated, cost is low and productivity is excellent has not been proposed.

SUMMARY OF THE INVENTION

The present invention has been made in view of the above circumstances and provides an optical member for optical path conversion to be connected to an optical waveguide provided in a substrate, a manufacturing method for efficiently producing the optical member, a waveguide substrate, and a photo-electric integrated substrate. Additionally provides a manufacturing method for efficiently producing an optical member for converting an optical path on an end of which a lens is formed.

According to an aspect of the invention, a manufacturing method of an optical member for optical path conversion to be connected to an optical waveguide provided in a substrate includes forming plural inclined surfaces on a wafer by etching, forming openings corresponding to the inclined surfaces in a plate-like member, forming a combined body, in which the inclined surfaces and the openings correspond to each other, by bonding the wafer and the plate-like member, and dividing the combined body into small pieces each of which includes the inclined surface and the opening.

BRIEF DESCRIPTION OF THE DRAWINGS

Embodiments of the invention will be described in detail based on the following figures, wherein.

DETAILED DESCRIPTION OF THE INVENTION

Hereinafter, a manufacturing method of an optical member (optical path converting member) for optical path conversion according to the invention will be described. First, an example of the optical member obtained by the manufacturing method of the invention will be described.

Figure 1:
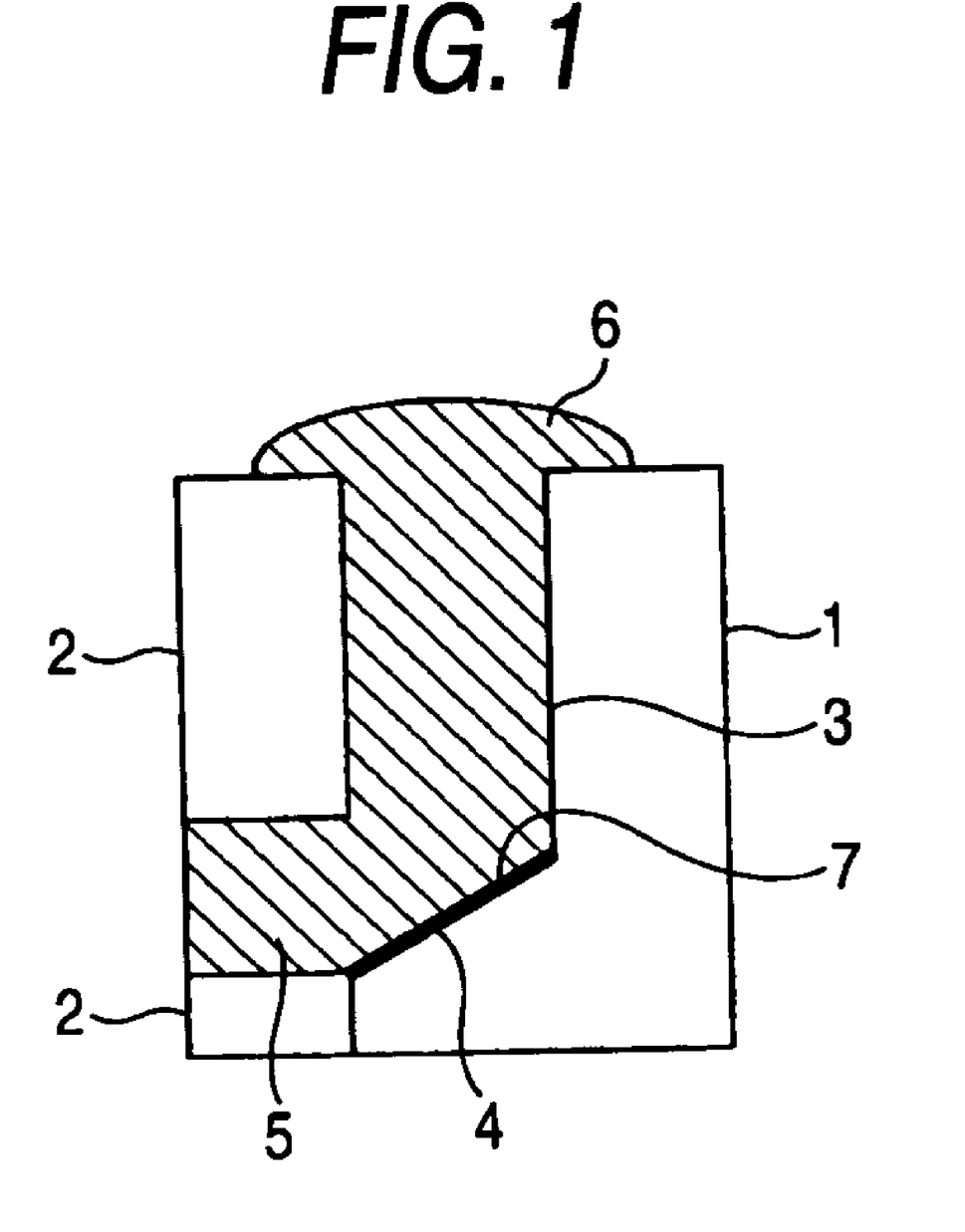
FIG. 1 is a sectional view showing an example of an optical member for optical path conversion obtained by a manufacturing method according to the invention.

FIG. 1 is a sectional view showing an example of an optical member for optical path conversion obtained by a manufacturing method of the invention. As shown in the drawing, in the optical member, a member 1 and a member 2 are bonded to each other, and an L-shaped tubular optical path 3 is provided between both of the members. The cross-section of the tubular optical path 3 may have various forms, for example, rectangular, triangular, circular or oval. An inclined surface 4 provided at the midpoint of the optical path 3 reflects light to convert its optical path by, for example, 90°. The inclined surface 4 is formed by etching. The member 1 is made of silicon, and the inclined surface 4 is formed by silicon anisotropic etching of the member 1. The angle of the inclined surface is, for example, 45°. A resin 5 is filled in the optical path 3, and a lens 6 is formed at one end of the optical path 3. The lens 6 can be formed of the resin filled in the optical path 3. Further, in order to improve the reflection of light, a metal thin film 7 can be coated on the inclined surface 4. By this, in the optical member, light incident on the optical path 3 from the lens 6 side or its opposite side is reflected by the inclined surface 4, the optical path is converted by 90°, and the light is emitted. Since the inclined surface 4 is formed by etching, the optical member can be made very small, and excellent optical path conversion characteristics can be obtained. Next, a manufacturing method of the optical member according to the invention will be described.

Embodiment 1

Figure 2A:
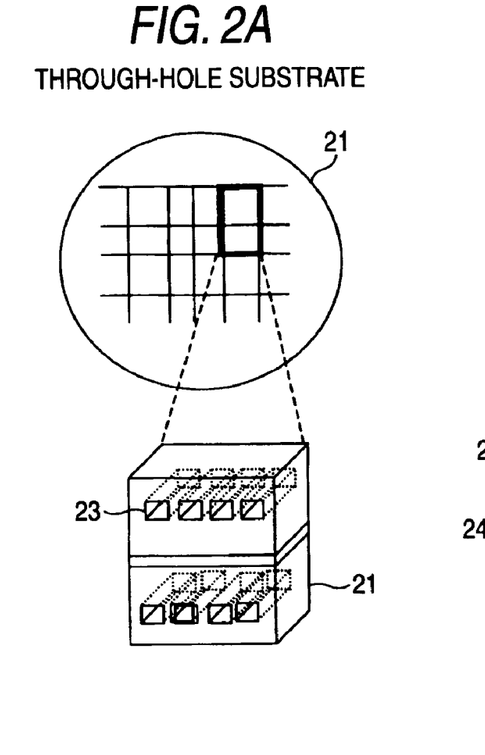
FIGS. 2A to 2D are views showing an embodiment of a manufacturing method of an optical member according to the invention.
Figure 2B:
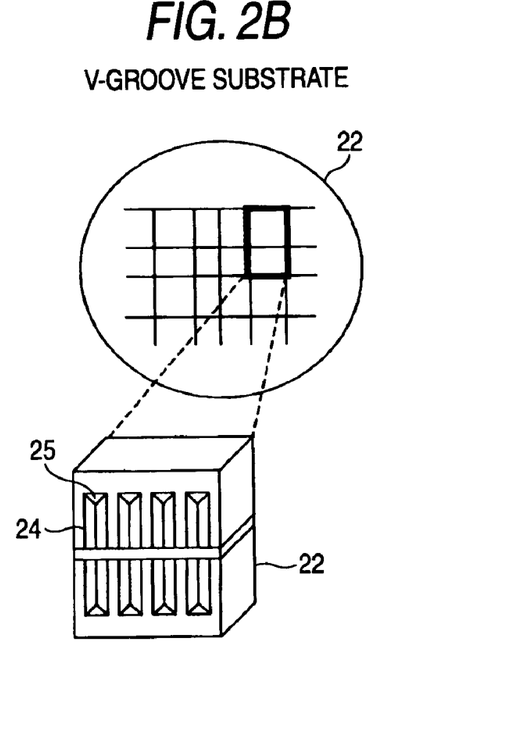
Figure 2C:
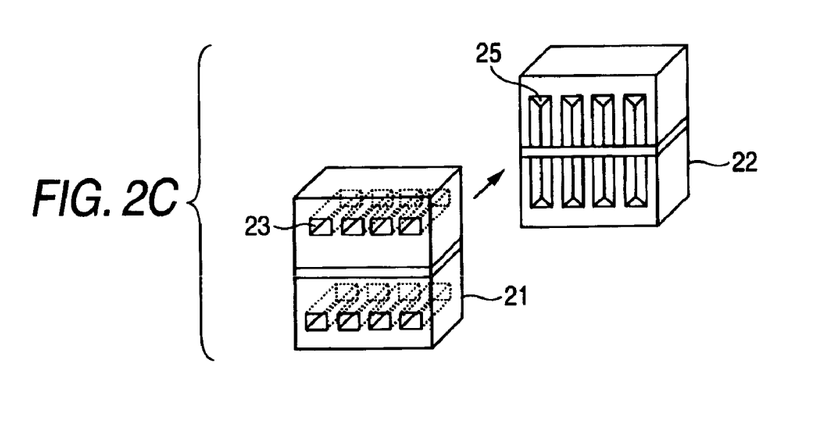

FIGS. 2A to 2D are views showing an embodiment of a manufacturing method of an optical member according to the invention. First, two silicon (Si) wafers 21 and 22 are prepared. As shown in a partial enlarged view of FIG. 2A, plural openings 23 (through holes) are formed in one Si wafer 21 to form a through-hole substrate. The openings 23 can be formed by, for example, reactive ion etching (RIE), laser or other methods known to those skilled in the art. Besides, as shown in a partial enlarged view of FIG. 2B, plural grooves (V grooves) 24 and inclined surfaces 25 are formed in the other Si wafer 22 to form a V-groove substrate. For example, a (100) Si wafer is used, and the V grooves 24 as shown in the drawing and the 45° inclined surfaces 25 at the ends of the V grooves can be formed by anisotropic etching. Here, the openings 23 and the inclined surfaces 25 are formed to correspond to each other in position. Next, as shown in FIG. 2C, the through-hole substrate 21 and the V-groove substrate 22 are bonded to each other so that the openings 23 and the inclined surfaces 25 correspond to each other, and a combined body is formed. Then, the combined body is diced into small pieces each of which includes the opening 23 of the through-hole substrate 21 and the inclined surface 25 of the V-groove substrate 22, and an optical member 26 is manufactured as shown in the sectional view of FIG. 2D. The optical path of the optical member 26 includes the opening 23, the V groove 24 and the inclined surface 25, and the optical path of incident light is converted by 90° by the inclined surface 25. The inclined surface 25 is formed at the end of the groove 24 here, but alternatively, it may be formed at the end of the opening 23.

Figure 2D:
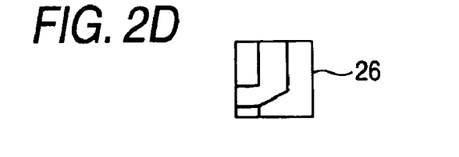

Here, although Si is used as the material of the through-hole substrate 21, the invention is not limited to this, and any material may be used as long as precise hole processing can be performed. For example, resin, metal, glass or the like may be used. Besides, the optical path formed in the optical member 26 may remain hollow, or transparent resin or the like may be filled therein. Further, a lens can be disposed at one end of the optical path. A formation method of the lens will next be described.

Figure 3A:
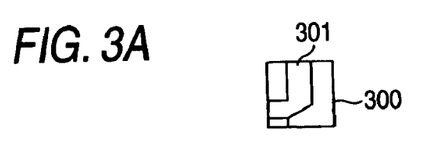
FIGS. 3A to 3L are views showing an embodiment of a method of forming a lens on an optical member according to the invention.
Figure 3B:
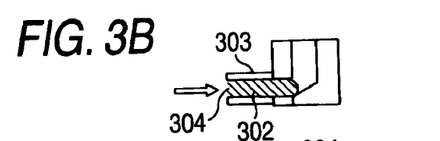
Figure 3C:
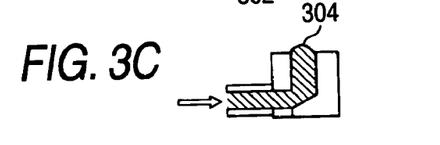
Figure 3D:
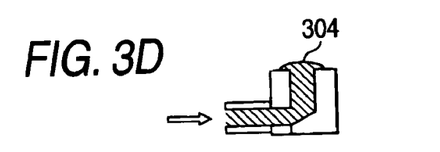
Figure 3E:
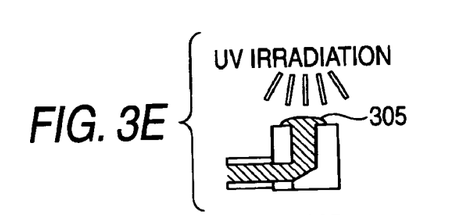
Figure 3F:
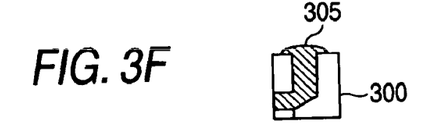
Figure 3G:
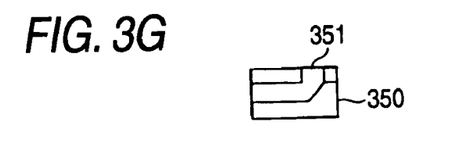
Figures 3H, 3I:
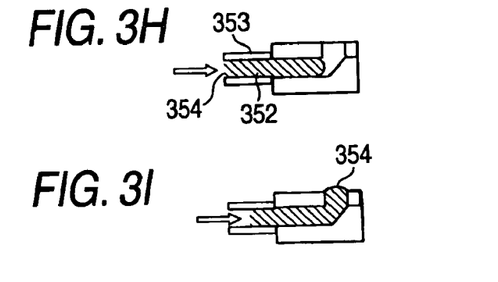
Figure 3J:
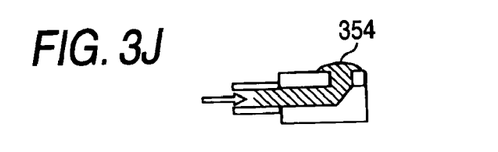
Figure 3K:
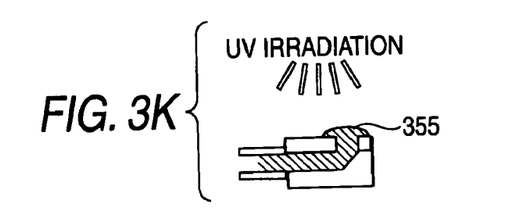
Figure 3L:
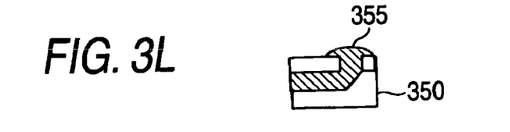

FIGS. 3A to 3L are views showing an embodiment of a method of forming a lens on an optical member according to the invention. FIGS. 3A to 3F show an example in which a lens is formed at an end of an optical path of the groove (V groove), and FIGS. 3G to 3L show an example in which a lens is formed at an end of an optical path of the opening. First, as shown in FIGS. 3A and 3G, optical members 300 and 350 are put while optical path ends 301 and 351 at which lenses are to be formed face upward. Next, as shown in FIGS. 3B and 3H, transparent ultraviolet (UV) curing resins 304 and 354 are injected through injection members 303 and 353 from optical path ends 302 and 352 at which lenses are not formed. At this time, as shown in FIGS. 3C and 3I, the resins are injected until they protrude from the optical path ends 301 and 351 at which the lenses are to be formed. Here, as shown in FIGS. 3D and 3J, the expansion of the resin protruding from the optical path ends 301 and 351 is suppressed by controlling the wettability of the surface. Subsequently, as shown in FIGS. 3E and 3K, the resins are cured by UV irradiation to form lenses 305 and 355. By this, as shown in FIGS. 3F and 3L, optical members with lenses are produced. Incidentally, the transparent resin injected into the optical path is not limited to the UV curing resin, and for example, thermosetting resin may be used.

According to this embodiment, the manufacturing method of the optical member with high productivity can be provided.

Embodiment 2

Figure 4A:
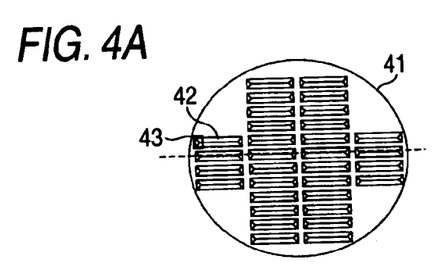
FIGS. 4A to 4J are views showing another embodiment of a manufacturing method of an optical member according to the invention.
Figure 4B:
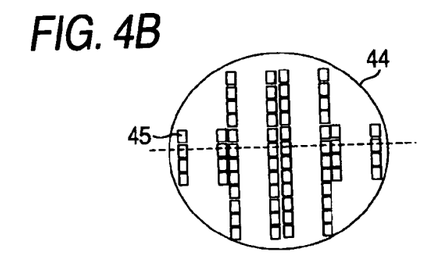
Figure 4C:
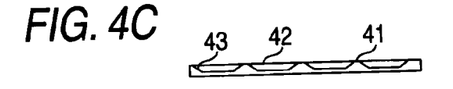
Figure 4D:
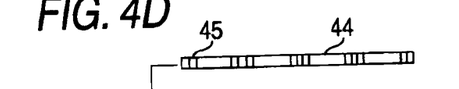
Figure 4E:
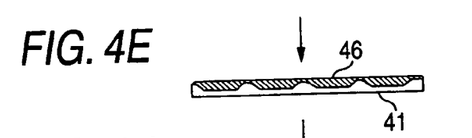
Figure 4F:
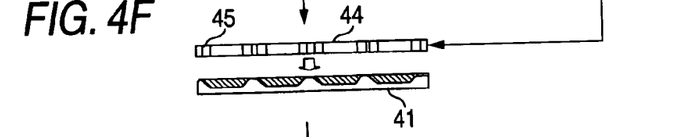
Figure 4G:
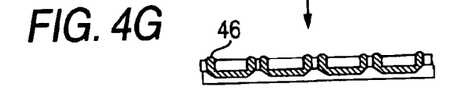
Figure 4H:
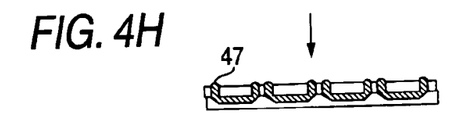
Figure 4I:
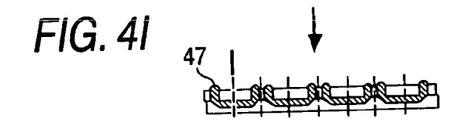
Figure 4J:
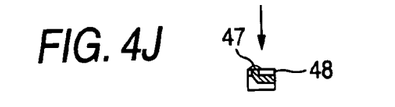

FIGS. 4A to 4J are views showing another embodiment of a manufacturing method of an optical member according to an aspect of the invention. In this embodiment, lenses are formed when two Si wafers are bonded to each other, and then, the optical member is cut out. First, two silicon (Si) wafers 41 and 44 are prepared. As shown in FIG. 4A, similarly to the embodiment 1, plural grooves (V grooves) 42 and inclined surfaces 43 are formed in one Si wafer 41 to form a V-groove substrate. Besides, as shown in FIG. 4B, plural openings 45 (through holes) are formed in the other Si wafer 44 to form a through-hole substrate. The openings 45 can be formed by, for example, reactive ion etching (RIE), laser or other methods known to those skilled in the art. Here, the inclined surfaces 43 and the openings 45 are formed to correspond to each other in position. FIG. 4C is a view showing a section of the V-groove substrate 41, and FIG. 4D is a view showing a section of the through-hole substrate 44. Next, as shown in FIG. 4E, a slightly large amount of transparent UV curing resin 46 is applied onto the V-groove substrate 41. Subsequently, as shown in FIG. 4F, the V-groove substrate 41 and the through-hole substrate 44 are bonded to each other so that the inclined surfaces 43 and the openings 45 correspond to each other, and a combined body is formed. At the time of bonding, as shown in FIG. 4Q, the resin 46 passes through the opening 45 and protrudes from the through-hole substrate 44. Then, as shown in FIG. 4H, the resin is cured by UV irradiation or thermosetting method to form lenses 47. Thereafter, as indicated by broken lines of FIG. 4I, the combined body is diced into small pieces each of which includes the inclined surface 43 of the V-groove substrate 41 and the opening 45 of the through-hole substrate 44, and an optical member 48 with a lens for optical path conversion is manufactured as shown in FIG. 4J.

Here, although Si is used as the material of the through-hole substrate 44, the invention is not limited to this, and any material may be used as long as precise hole processing can be performed. For example, resin, metal, glass or the like may be used. Besides, the transparent resin injected into the optical path is not limited to the UV curing resin, and for example, thermosetting resin may be used.

According to this embodiment, the manufacturing method of the optical member with the lens excellent in productivity can be provided.

Embodiment 3

Figure 5A:
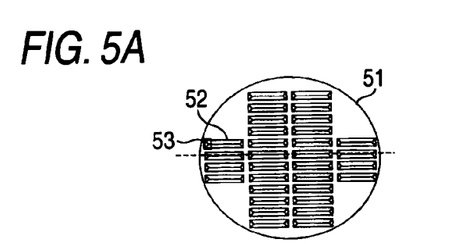
FIGS. 5A to 5I are views showing another embodiment of a manufacturing method of an optical member according to the invention.
Figure 5B:
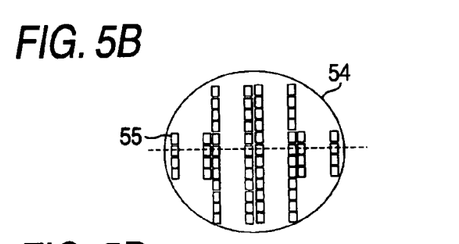
Figure 5C:
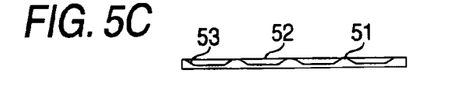
Figure 5D:
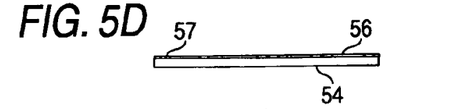
Figure 5E:
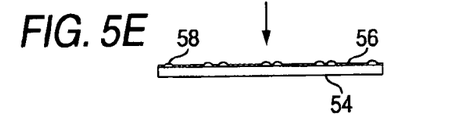
Figure 5F:
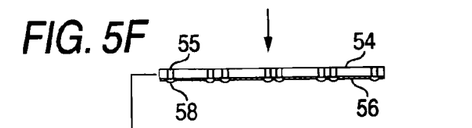
Figure 5G:
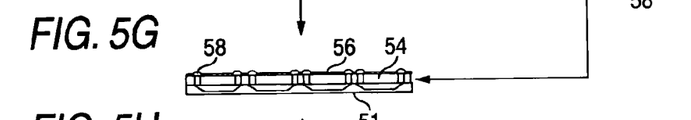
Figures 5H, 5I:
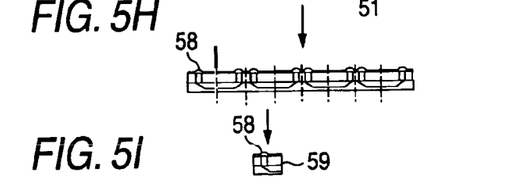

FIGS. 5A to 5I are views showing another embodiment of a manufacturing method of an optical member according to an aspect of the invention. In this embodiment, before the formation of openings in a through-hole substrate, lenses are formed at the formation positions of the openings. First, two silicon (Si) wafers 51 and 54 are prepared. As shown in FIG. 5A, similarly to the embodiment 1, plural grooves (V grooves) 52 and inclined surfaces 53 are formed in one Si wafer 51 to form a V-groove substrate. FIG. 5C is a view showing a section of the V-groove substrate 51. Besides, as shown in FIG. 5B, plural openings 55 (through holes) are formed in the other Si wafer 54 to form a through-hole substrate. However, in this embodiment, before the openings 55 are formed, lenses are formed at the formation positions of the openings as described below. That is, as shown in FIG. 5D, holes are bored or etched in a thin plate member (film) 56 disposed on the Si wafer 54 at positions 57 where the lenses are to be formed, and patterning is made on the peripheries thereof by water-repellent material (or patterning is made on the positions corresponding to the lenses by hydrophilic material). Then, as shown in FIG. 5E, plural lenses 58 are formed correspondingly to the positions 57 of the pattern holes. For example, the lenses 58 may be collectively formed by, screen printing of transparent UV curing resin or dipping. However, the lenses 58 can also be individually formed by an ink-jet apparatus, a dispense apparatus or the like. In the case of the individual formation, there is a merit that a mask is unnecessary. After the lenses 58 are formed, as shown in FIG. 5F, the Si wafer 54 is turned upside down, and openings 55 are formed at the positions corresponding to the lenses 58. The openings 55 can be formed by laser, RIE or others known to those skilled in the art. Next, as shown in FIG. 5Q the V-groove substrate 51 and the through-hole substrate 54 on which the lenses 58 are formed are bonded to each other, and a combined body is formed. Thereafter, as indicated by broken lines of FIG. 5H, the combined body is diced into small pieces each of which includes the inclined surface 53 of the V-groove substrate 51 and the opening 55 of the through-hole substrate 54, and as shown in FIG. 5I, an optical member 59 with a lens for optical path conversion is manufactured.

Here, although Si is used as the material of the through-hole substrate 54, the invention is not limited to this, and any material may be used as long as precise hole processing can be performed. For example, resin, metal, glass or the like may be used.

According to this embodiment, the manufacturing method of the optical member with the lens excellent in mass productivity can be provided. Besides, since resin is not filled in the optical path formed in the optical member, the optical member can be manufactured at low cost.

Embodiment 4

Figure 6A:
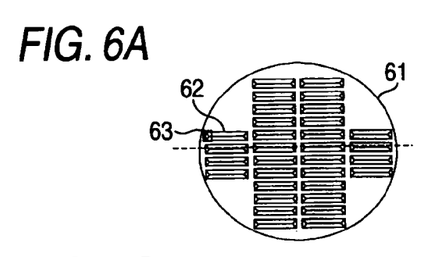
FIGS. 6A to 6H are views showing another embodiment of a manufacturing method of an optical member according to the invention.
Figure 6B:
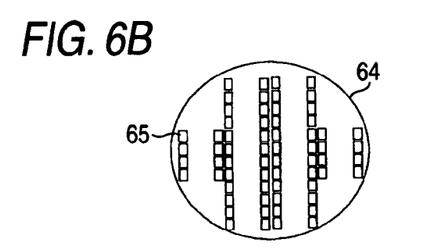
Figure 6C:
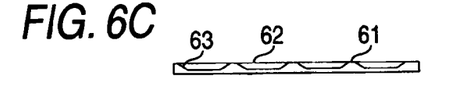
Figure 6D:
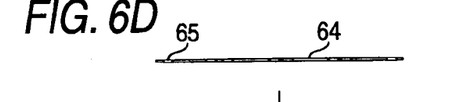
Figure 6E:
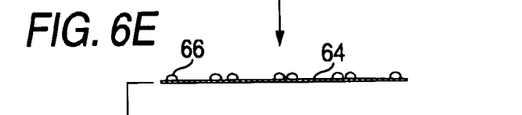
Figures 6F, 6G:
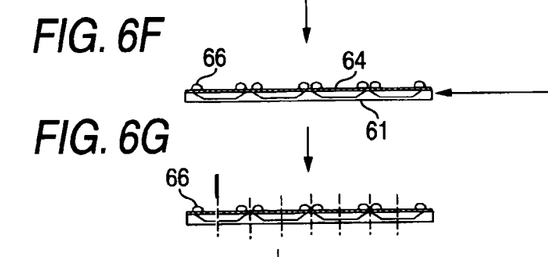
Figure 6H:
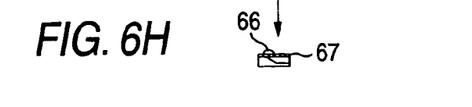

FIGS. 6A to 6H are views showing another embodiment of a manufacturing method of an optical member according to an aspect of the invention. In this embodiment, plural lenses are formed on a thin plate member without using a through-hole substrate. First, a thin plate member (film) 64 having the same shape as a silicon (Si) wafer 61 is prepared. As shown in FIG. 6A, similarly to the embodiment 1, plural grooves (V grooves) 62 and inclined surfaces 63 are formed in the Si wafer 61 to form a V-groove substrate. FIG. 6C is a view showing a section of the V-groove substrate 61. Besides, as shown in FIG. 6B, lenses are formed on the film 64 as described below. That is, as shown in FIG. 6D, holes are bored in the film 64 at positions 65 where the lenses are to be formed, and patterning is made on the peripheries thereof by water-repellent material (or patterning is made on the positions corresponding to the lenses by hydrophilic material). As shown in FIG. 6E, plural lenses 66 are formed at the positions 65 of the pattern holes. For example, the lenses 66 may be collectively formed by screen printing of transparent UV curing resin or dipping. However, the lenses 66 can also be individually formed by an ink-jet apparatus or a dispense apparatus. In the case of the individual formation, there is a merit that a mask is unnecessary. Next, as shown in FIG. 6F, the V-groove substrate 61 and the film 64 on which the lenses 66 are formed are bonded to each other to form a combined body. Thereafter, as indicated by broken lines of FIG. 6G, the combined body is diced into small pieces each of which includes the inclined surface 53 of the V-groove substrate 61 and the lens 66, and as shown in FIG. 6H, an optical member 67 with a lens for optical path conversion is manufactured.

Here, as the film 64, what is transparent to light of a wavelength of a light source to be used is selected. Besides, with respect to the film 64, instead of forming the lenses later as in the embodiment, a film on which lenses are previously formed may be used.

According to this embodiment, the manufacturing method of the optical member with the lens excellent in mass productivity can be provided. Besides, since the structure is such that the film with the lenses is merely disposed on the V-groove substrate, reduction in thickness of the optical member and reduction in weight can be realized.

Embodiment 5

Figure 7:
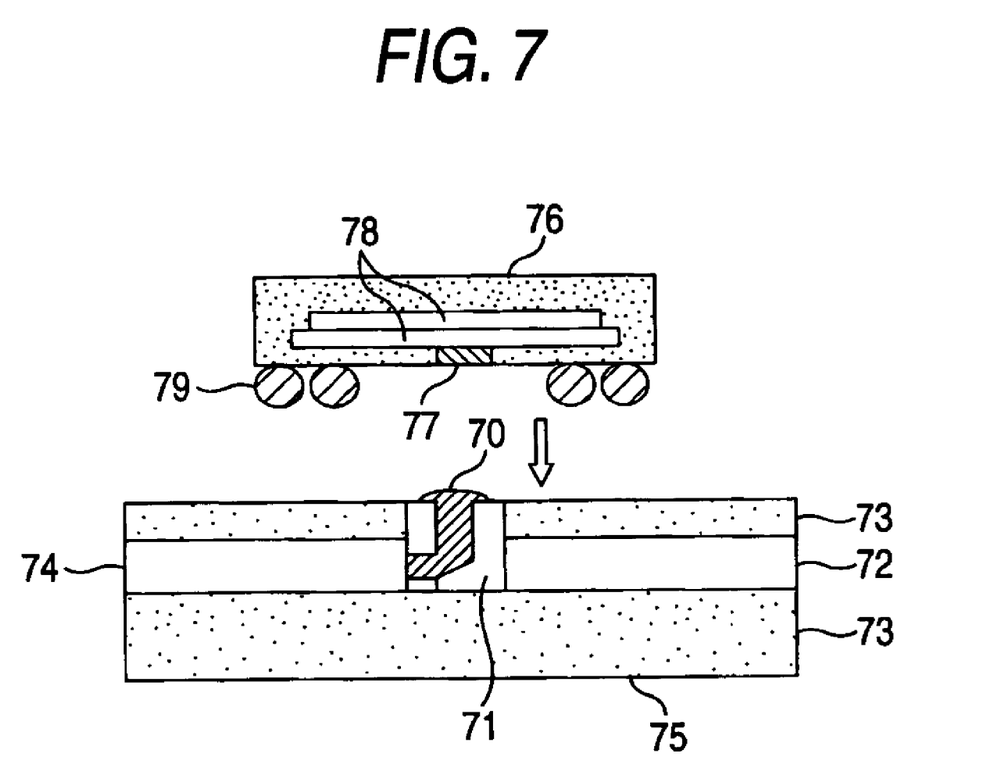
FIG. 7 is view showing an embodiment of a manufacturing method of a photo-electric integrated substrate using an optical member according to the invention.

FIG. 7 is a view showing an embodiment of a manufacturing method of a photo-electric integrated substrate using an optical member according to an aspect of the invention. In this embodiment, a photo-electric integrated substrate on which an optical multi-chip module (MCM) is mounted is manufactured as described below. First, an optical member 71 with a lens is manufactured by the method described in the embodiment 1. On the other hand, a waveguide substrate 75 including an optical waveguide 74 made of a core layer 72 and a clad layer 73 is formed. The optical member 71 is embedded in the waveguide substrate 75. In this case, the optical waveguide 74 may be formed after the optical member 71 is disposed in the substrate 75, or the optical member 71 may be disposed by boring a hole in the substrate 75 after the optical waveguide 74 is formed in the substrate 75. A not-shown electric wiring is provided on the surface of the waveguide substrate 75. An optical MCM 76 is mounted on this substrate 75. The optical MCM 76 includes a light emitting element (and/or a light receiving element) 77 and an electric circuit 78 connected thereto. Solder balls 79 are provided at the lower part of the optical MCM 76, and the optical MCM 76 is fixed onto the waveguide substrate 75 by these. The positioning between the waveguide substrate 75 and the optical MCM 76 is performed by recognizing a lens 70 provided on the optical member 71 or a not-shown groove. For example, the positioning is performed so that the optical axis of the lens 70 and the center of the light emitting element 77 coincide with each other. In the manner as described above, the photo-electric integrated substrate on which the optical MCM is mounted is manufactured.

In general, very high accuracy (±5 µm or less) is required for the mounting accuracy of an optical MCM to an optical waveguide. According to this embodiment, the positioning between the substrate and the optical MCM can be easily and satisfactorily performed by recognizing the lens provided on the optical member or the groove.

Embodiment 6

Figure 8A:
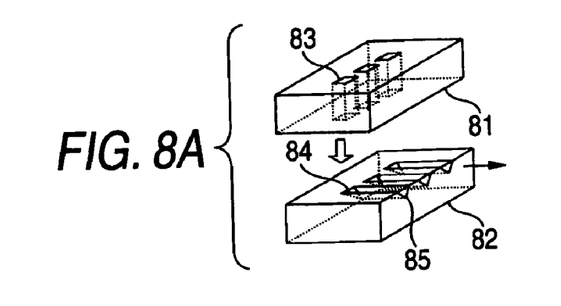
FIGS. 8A to 8F are views showing another embodiment of a manufacturing method of an optical member according to the invention.
Figure 8B:
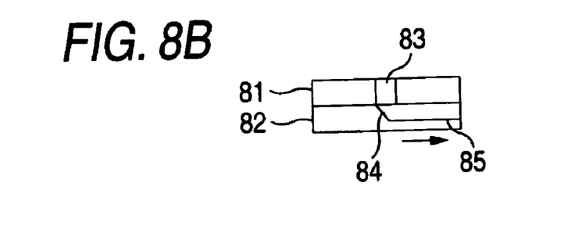

FIGS. 8A to 8F are views showing another embodiment of a manufacturing method of an optical member according to an aspect of the invention. In this embodiment, with respect to an optical member having an array structure connectable to plural optical waveguides, three examples are described. FIG. 8A is a perspective view showing an example of an optical member for connection with optical waveguides of a parallel array shape. This optical member is a block obtained such that a combined body of a through-hole substrate 81 and a V-groove substrate 82 are manufactured by the same method as the foregoing embodiment, and the combined body is diced into small pieces in each of which three optical paths are formed. In this example, although the small pieces are formed after the through-hole substrate 81 and the V-groove substrate 82 are bonded, after the through-hole substrate 81 and the V-groove substrate 82 are respectively divided into small pieces, the small pieces may be bonded to each other. In any event, both are bonded to each other so that openings 83 and inclined surfaces 84 correspond to each other. FIG. 8B is a sectional view of the optical member formed to be the small piece as stated above. In FIG. 8B, an arrow indicating the longitudinal direction of a groove (V groove) 85 indicates the direction of an optical waveguide to which the optical member is connected.

Figure 8C:
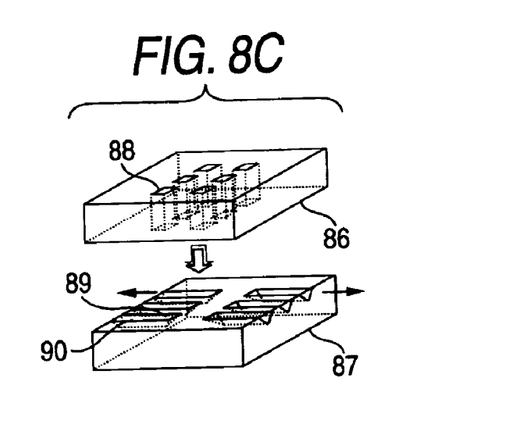
Figure 8D:
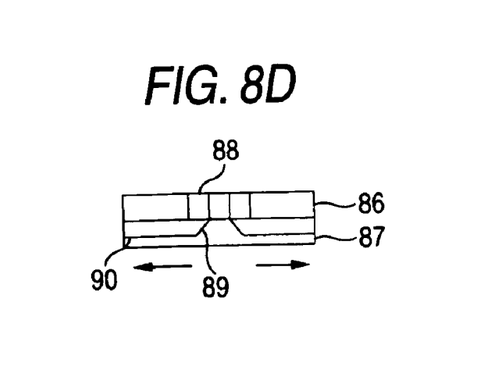

FIG. 8C is a perspective view showing an example of an optical member for connection with optical waveguides in two directions opposite to each other. The optical member is a block provided such that a combined body of a through-hole substrate 86 and a V-groove substrate 87 are manufactured by the same method as the foregoing embodiment, and the combined body is diced into small pieces in each of which three pairs of optical paths extending in the directions opposite to each other are formed. In this example, although the small pieces are formed after the through-hole substrate 86 and the V-groove substrate 87 are bonded to each other, after the through-hole substrate 86 and the V-groove substrate 87 are respectively diced into small pieces, the respective small pieces may be bonded to each other. In any event, both are bonded to each other so that openings 88 and inclined surfaces 89 correspond to each other. FIG. 8D is a sectional view of the optical member formed to be the small piece as stated above. In FIG. 8D, arrows indicating the longitudinal directions of grooves (V grooves) 90 indicate directions of optical waveguides to which the optical member is connected.

Figure 8E:
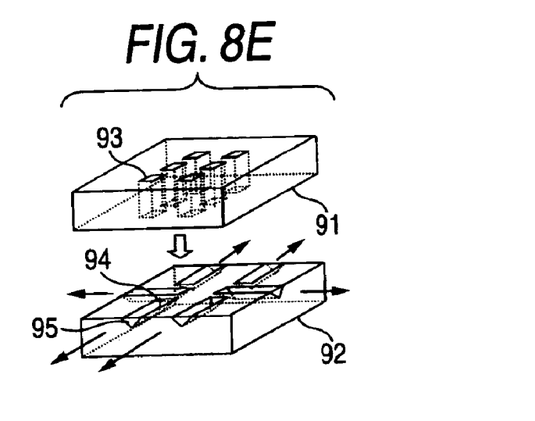
Figure 8F:
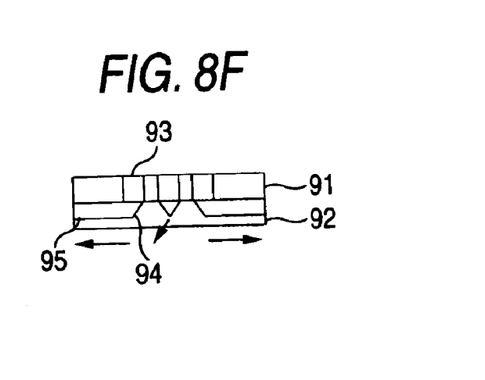

FIG. 8E is a perspective view showing an example of an optical member for connection with optical waveguides in four directions. The optical member is a block obtained such that a combined body of a through-hole substrate 91 and a V-groove substrate 92 is manufactured by the same method as the foregoing embodiment, and the combined body is diced into small pieces in each of which optical paths extending in four directions are formed. In this example, although the small piece is formed after the through-hole substrate 91 and the V-groove substrate 92 are bonded to each other, after the through-hole substrate 91 and the V-groove substrate 92 are respectively diced into small pieces, the respective small pieces may be bonded to each other. In any event, both are bonded to each other so that openings 93 and inclined surfaces 94 correspond to each other. FIG. 8F is a sectional view of the optical member formed to be the small piece. In FIG. 8F, arrows indicating longitudinal directions of grooves (V grooves) 95 indicate directions of optical waveguides to which the optical member is connected.

As described above, in the optical member according to an aspect of the invention, since the reflecting surfaces (mirrors) are formed by anisotropic etching, it is possible to arrange the reflecting surfaces at high density. Besides, since production can be made in wafer units, the productivity is excellent, and the optical member can be manufactured at low cost. Besides, the mounting accuracy itself of the optical MCM can be moderated by using the optical member with the lens, and the productivity of the optical waveguide substrate can be improved. Besides, in the invention, the position of the optical path to be connected can be directly recognized by using the 90° optical path conversion member, and high accuracy positioning can be performed.

The invention relates to a manufacturing method of an optical member to be connected to an optical waveguide provided in a substrate, and particularly to a manufacturing method of an optical member for optical path conversion, which converts an optical path of light transmitting through an optical waveguide, and has industrial applicability.

As described above, some aspects of the invention are outlined below.

According to an aspect of the invention, a manufacturing method of an optical member for optical path conversion to be connected to an optical waveguide provided in a substrate includes forming plural inclined surfaces on a wafer by etching, forming openings corresponding to the inclined surfaces in a plate-like member, forming a combined body, in which the inclined surfaces and the openings correspond to each other, by bonding the wafer and the plate-like member, and dividing the combined body into small pieces each of which includes the inclined surface and the opening.

Here, the manufacturing method may further include coating a metal thin film on the inclined surface. Besides, when the combined body is divided into the small pieces, each of the small pieces may include the two or more inclined surfaces and the two or more corresponding openings. When the inclined surfaces are formed, the plural inclined surfaces inclined in different directions may be formed, and when the combined body is divided into the small pieces, each of the small pieces may include the two or more inclined surfaces inclined in the different directions and the two or more corresponding openings. The manufacturing method may further include providing lenses at the openings. The lenses may be formed of resin injected into the openings. The resin may be cured at places where it overflows from the openings. Besides, the lenses may be formed at formation positions of the openings before the openings are formed.

Besides, according to another aspect of the invention, a manufacturing method of an optical member for optical path conversion to be connected to an optical waveguide provided in a substrate includes forming plural inclined surfaces on a wafer by etching, forming lenses corresponding to the inclined surfaces on a thin plate member, forming a combined body, in which the inclined surfaces and the lenses correspond to each other, by bonding the wafer and the thin plate member, and dividing the combined body into small pieces each of which includes the inclined surface and the lens. Here, the lenses may be formed of resin disposed on the thin plate member.

The resin may be cured by ultraviolet irradiation.

Further, according to another aspect of the invention, a manufacturing method of an optical member for optical path conversion includes forming a tubular optical path including an inclined surface to change an optical path in the member, and forming a lens by filling resin from one end of the tubular optical path and by curing the resin in a state where the resin overflows from the other end.

Besides, according to another aspect of the invention, a manufacturing method of an optical member for optical path conversion includes forming a groove including an inclined surface to convert an optical path in a first substrate, forming an opening corresponding to the inclined surface in a second substrate, applying resin to the groove of the first substrate, overlapping the second substrate on the first substrate to which the resin has been applied, and forming a lens by curing the resin protruding from the opening of the second substrate by the overlapping.

Besides, according to another aspect of the invention, a manufacturing method of an optical member for optical path conversion includes forming a groove including an inclined surface to convert an optical path in a first substrate, forming a hole in a thin plate member disposed on a second substrate at a position corresponding to the inclined surface, forming a lens by curing resin applied correspondingly to the hole of the thin plate member, forming an opening in the second substrate at a position corresponding to the lens, and overlapping the first substrate on the second substrate to cause the inclined surface to correspond to the opening.

Besides, according to another aspect of the invention, a manufacturing method of an optical member for optical path conversion includes forming a groove including an inclined surface to convert an optical path in a substrate, forming a hole in a thin plate member at a position corresponding to the inclined surface, forming a lens by curing resin applied correspondingly to the hole of the thin plate member, and overlapping the substrate on the thin plate member to cause the inclined surface to correspond to a position of the lens.

Here, the inclined surface to convert the optical path may be formed by etching.

Further, according to another aspect of the invention, an optical member includes a first member including a groove and an inclined surface at an end of the groove, and a second member including an opening, wherein a tubular optical path in which an optical path is converted by the inclined surface is formed by bonding the first member and the second member to cause the inclined surface to correspond to the opening. Here, a lens may be provided at one end of the tubular optical path. Besides, resin may be filled in the tubular optical path. Further, the inclined surface may be formed by etching.

According to another aspect of the present invention, an optical member includes a first member including a groove along with a horizontal direction, a second member including an opening along with a vertical direction, a surface formed at one of the end of the groove and the end of the opening, the surface being inclined to both horizontal and vertical directions, wherein an optical path is formed by bonding the first member and the second member, the optical path having the groove, the opening and the inclined surface.

Besides, according to another aspect of the invention, a waveguide substrate includes the optical member, and an optical waveguide optically connected to one end of an optical path of the optical member. Further, according to another aspect of the invention, a photo-electric integrated substrate includes the waveguide substrate, and an optical module on which an optical element optically connected to the other end of the optical path of the optical member included in the waveguide substrate is mounted.

According to an aspect of the invention, since the optical member for optical path conversion (optical path converting member) is manufactured by etching, the inclined surfaces (reflecting surfaces) can be produced at high density, and the productivity is high. Besides, since the optical member of the invention has a simple structure, the structure of the waveguide substrate can also be simplified. Further, since the positioning of an optical MCM is easy with respect to a substrate in which the optical member of the invention is embedded, the mounting accuracy of the optical MCM can be improved. Besides, by using the optical member with the lens of the invention, the mounting accuracy of the optical MCM can be moderated. Further, when the optical member of the invention is made to have the array structure including plural optical paths, it is possible to facilitate the connection with optical waveguides in many directions.

The foregoing description of the embodiments of the present invention has been provided for the purpose of illustration and description. It is not intended to be exhausted or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-083309 filed on Mar. 23, 2005 including specification, claims, drawings and abstract is incorporated herein by reference in its entirety.

What is claimed is:

1. A manufacturing method of an optical member for optical path conversion to be connected to an optical waveguide provided in a substrate, comprising:

forming a plurality of inclined surfaces on a wafer by etching;

forming openings corresponding to the inclined surfaces in a plate-like member;

forming a combined body, in which the inclined surfaces and the openings correspond to each other, by bonding the wafer and the plate-like member; and dividing the combined body into small pieces each of which includes the inclined surface and the opening, wherein the openings corresponding to the inclined surfaces penetrate the thickness of the plate-like member.

2. The manufacturing method of the optical member according to claim 1, further comprising coating the inclined surfaces with metal thin films.

3. The manufacturing method of the optical member according to claim 1, wherein when the combined body is divided into the small pieces, each of the small pieces includes the two or more inclined surfaces and the two or more corresponding openings.

4. The manufacturing method of the optical member according to claim 1, wherein when the inclined surfaces are formed, the plurality of inclined surfaces inclined in different directions are formed, and when the combined body is divided into the small pieces, each of the small pieces includes the two or more inclined surfaces inclined in one of the different directions and the two or more corresponding openings.

5. The manufacturing method of the optical member according to claim 1, further comprising providing lenses at the openings.

6. A manufacturing method of an optical member for optical path conversion to be connected to an optical waveguide provided in a substrate, comprising:

forming a plurality of inclined surfaces on a wafer by etching;

forming lenses corresponding to the inclined surfaces on a thin plate member;

forming a combined body, in which the inclined surfaces and the lenses correspond to each other, by bonding the wafer and the thin plate member; and dividing the combined body into small pieces each of which includes the inclined surface and the lens.

7. The manufacturing method of the optical member according to claim 6, wherein the lenses are formed of resin disposed on the thin plate member.

8. The manufacturing method of the optical member according to claim 7, wherein the resin is cured by an ultraviolet irradiation method.

9. A manufacturing method of an optical member for optical path conversion, comprising:

forming a groove including an inclined surface to convert an optical path in a substrate;

forming a hole in a thin plate member at a position corresponding to the inclined surface;

forming a lens by curing resin applied correspondingly to the hole of the thin plate member; and overlapping the substrate on the thin plate member to cause the inclined surface to correspond to a position of the lens.

* * * * *